June 18, 1957  R. VAN PEBORGH  2,796,267
TRANSVERSE COMPENSATING BAR STABILIZER
ARRANGEMENT FOR VEHICLE SUSPENSIONS
Filed Dec. 11, 1953  4 Sheets-Sheet 1
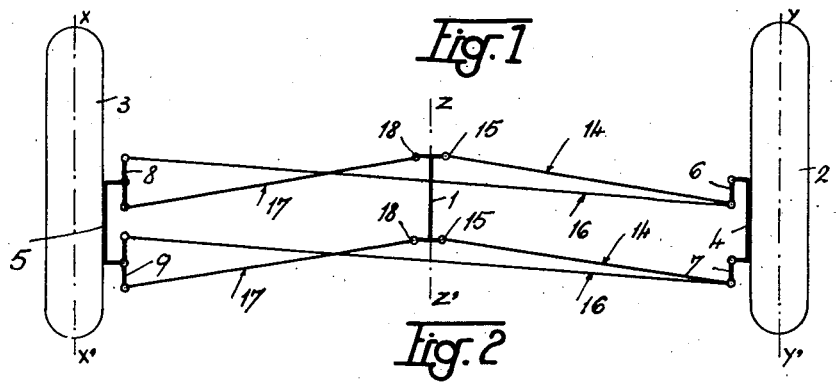
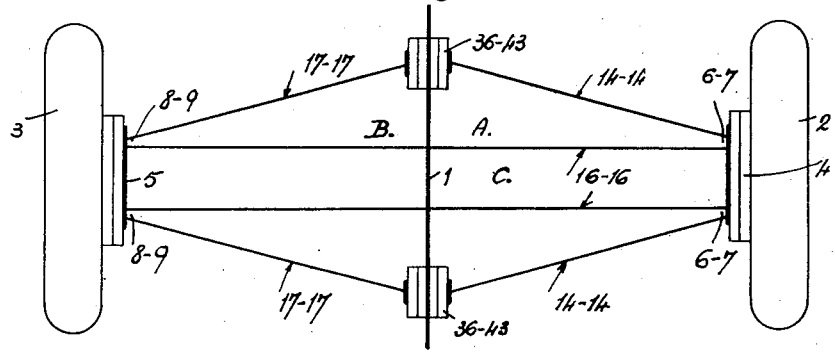
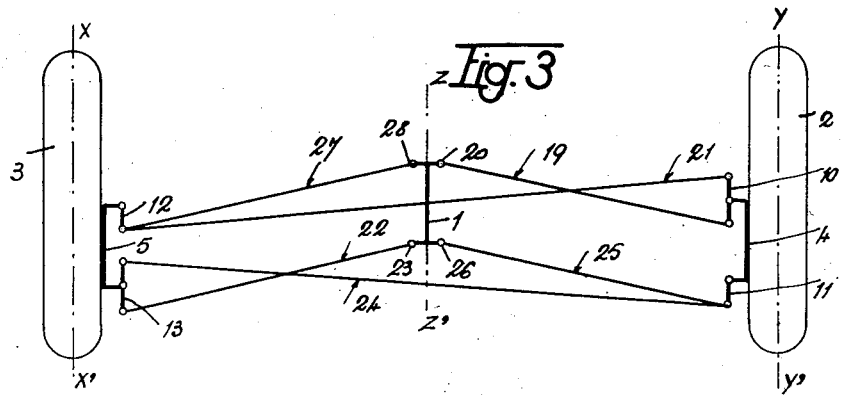
Inventor
Robert Van Peborgh
by Malcolm W. Fraser
attorney

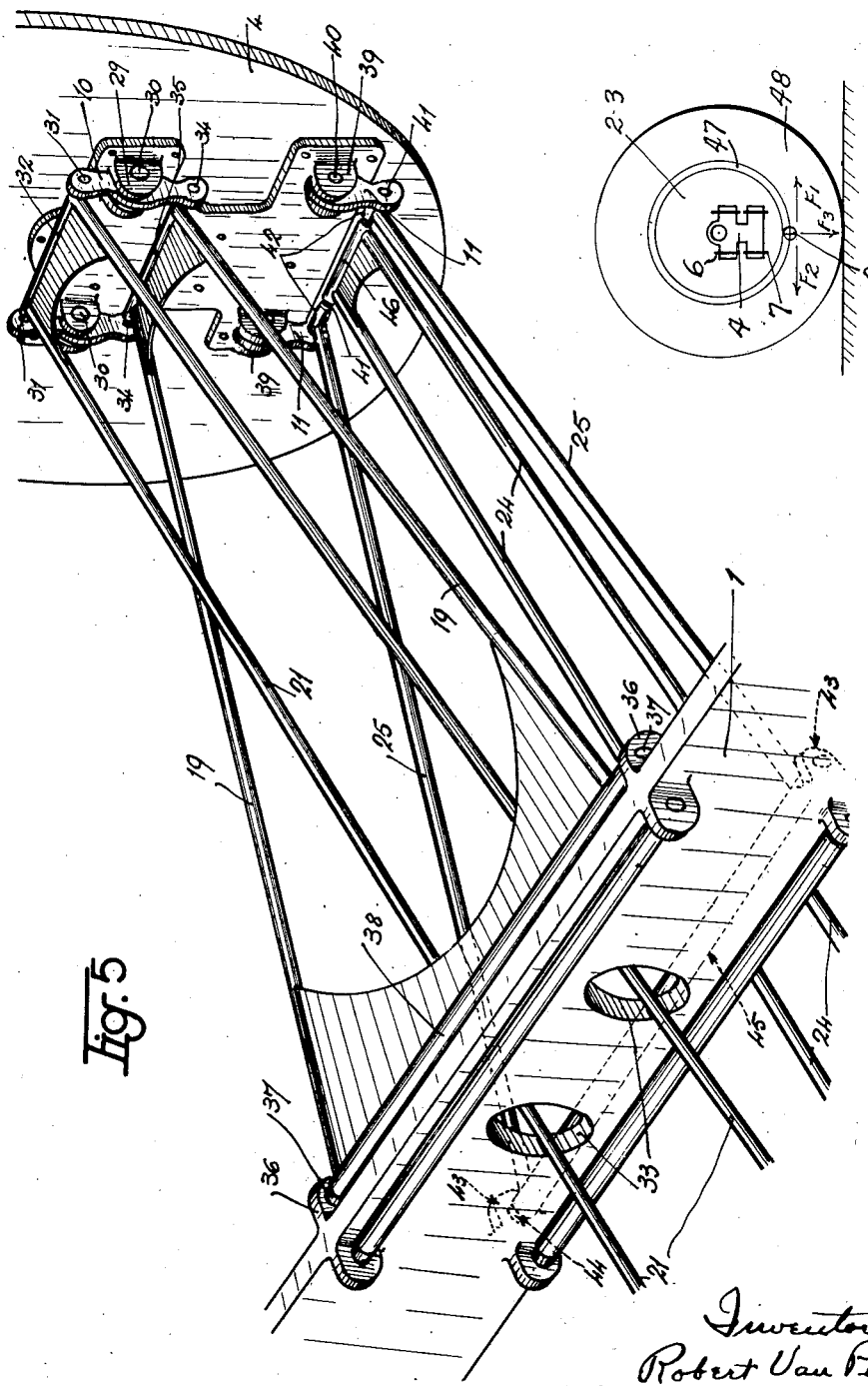

Inventor
Robert Van Peborgh
by Nicholas W. Fraser
attorney 2,796,267
Patented June 18, 1957

2,796,267

TRANSVERSE COMPENSATING BAR STABILIZER ARRANGEMENT FOR VEHICLE SUSPENSIONS

Robert van Peborgh, Paris, France

Application December 11, 1953, Serial No. 397,758

Claims priority, application France December 18, 1952

4 Claims. (Cl. 280—112)

The present invention relates to a stabilizing suspension arrangement for vehicles. The term "vehicles" is intended to include any contrivance moving on the ground. In addition to motor vehicles, it includes e. g. agricultural machines, tractors and aircraft undercarriages.

For the purpose of the invention, it is preferable to replace the usual longitudinal beams of the vehicle chassis by a single longitudinal rigid beam on the fore-and-aft centre line or by rigid members spaced only a small distance on either side of the centre line.

According to the invention, a vehicle suspension arrangement for resiliently connecting a fore-and-aft chassis member to two plates or like elements each fast with the part on which one wheel of a pair is adapted to rotate, each plate or like element has four pivots in pairs at two different levels all with fore-and-aft axes, a stirrup is suspended on each upper and lower pair of pivots, two bars connect each stirrup to the chassis member by pivotal connections at different fore-and-aft positions, and further compensating bars connect by pivotal connections at least one stirrup on one plane of the wheel with an equal and opposite extension of the corresponding stirrup beyond the pivot thereof on the other plane of wheel.

It is preferable for the centre of gravity of the system to be located for each axle below the axis of the wheels, and at the level of the lowest point of the inner circumference of the tires.

There are thus obtained three normally vertical fore-and-aft planes passing respectively through the central longitudinal beam and through the circumference line of the wheels, the three planes always remaining strictly parallel either in their normal vertical position or in any sloping position assumed when the vehicle is turning on a path of any curvature or in any position due to camber or other lack of level of the road. This is due to the compensating bars, namely those connecting a stirrup on one wheel to the extension of a stirrup on the corresponding wheel on the other side.

When turning, the vehicle will assume a sloping position towards the inside of the curve and no longer towards the outside as is the case with the vehicles now in use.

In the case of any lack of level across the width of the road traversed by a wheel of the vehicle due to camber or any irregularity, the three above mentioned planes will remain vertical, and the vehicle will not move laterally out of its normal position.

Lastly, the propelling and braking forces exerted by the vehicle will only serve to increase the adherence between its wheels and the ground.

Further features of the invention will appear from the description now to be given of various embodiments by way of example and shown in the accompanying drawings, wherein:

Figs. 1 and 2 are diagrammatic elevation and plan respectively of a first form of suspension stabilized in accordance with the invention;

Figs. 3 and 4 are similar views of a second form;

Fig. 5 is a perspective view on a larger scale of the right hand side of the arrangement shown in Fig. 3;

Fig. 8 is a diagrammatic view of a wheel showing the location of the centre of gravity and the resultant of the reactions opposing the propelling and braking forces to which the vehicle is subjected;

Figure 4:
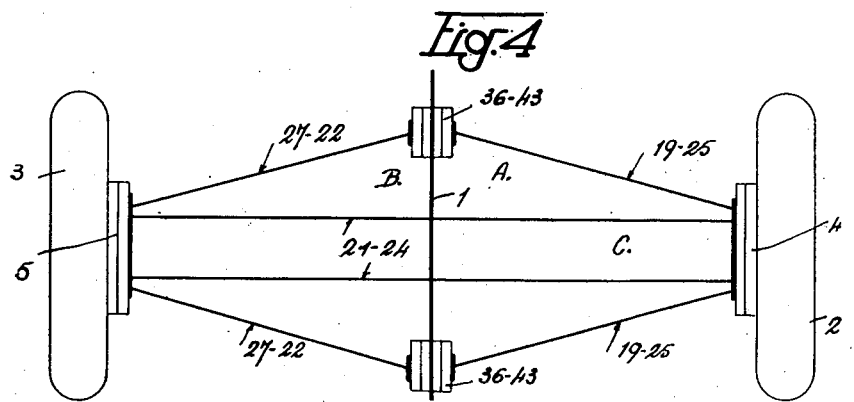

Referring to the drawings, the vehicle includes a rigid fore-and-aft central chassis 1 in the form of a beam, which may be of the I section shown in the drawing or tubular or cruciform section, or it may be in the form of a lattice girder or any other suitable form.

The beam 1 has the vehicle axles connected as disclosed hereinafter. 2 and 3 denote the two wheels carried at the end of one and the same axle. The term "axle" is used here in a broad sense to indicate the connections of the wheels to the chassis.

The stationary discs associated with the wheels carry the brakes and ball bearings in the usual manner, and to those discs are secured to extend below the wheel axes, plates 4 and 5 respectively to which are attached:

(a) either (Fig. 1) on the right hand plate 4, two pairs of pivotally mounted single stirrups 6 and 7 and, on the left hand plate 5, two pairs of pivotally mounted stirrups 8 and 9 extended upwards to constitute double stirrups, (b) or (Fig. 3) on the right hand plate 4, one pair of double stirrups 10 at the top and one pair of single stirrups 11 at the bottom, and on the left hand plate 5, the same system of stirrups but reversed, namely: the single stirrups 12 at the top and the double stirrups 13 at the bottom.

In the first form of construction, Figs. 1 and 2, there is pivotally secured to each of the single stirrups 6 and 7 on the right hand side, a connection bar 14 pivotally attached at 15 to the beam 1; and to each of said simple shackles 6 and 7 on the right hand side, is also pivotally attached a compensating bar 16 pivotally attached at its other end to the upper part of the corresponding double stirrup 8 or 9 on the left hand side. To the lower part of each of the double stirrups on the left hand side is pivotally attached a connecting bar 17 which is pivotally attached by its other end at 18 to the beam 1.

In the second form of construction (Figs. 3 and 4) there are connected to each double stirrup 10 on the right hand side: a connecting bar 19 pivotally attached at its other end at 20 to the beam 1 and to the upward extension of each double stirrup 10 a compensating bar 21 pivotally attached by its other end to the corresponding single stirrup 12 on the left hand side.

Similarly to each double stirrup 13 on the left hand side are pivotally attached: a connecting bar 22 pivotally attached by its other end at 23 to the beam 1 and a compensating bar 24 pivotally attached by its other end to the corresponding single stirrup 11 on the right hand side.

Lastly, to each single stirrup 11 on the right hand side is pivotally attached a connecting bar 25 pivotally attached at 26 to the beam 1 and to each single stirrup 12 on the left hand side is pivotally attached a connecting bar 27 pivotally attached at 28 to the beam 1.

Fig. 5 shows details of the plate 4 at the right hand end of the axle in the case of the second constructional form, viz. that of Figs. 3 and 4.

The plate 4 carries two pairs of lugs 29 on which is pivotally mounted at 30 a double stirrup 10; the upper end of the stirrup is constituted by a rod 31 carrying a freely rotatable sleeve 32, to which are rigidly attached the two compensating bars 21. The latter pass through the beam 1, which for this purpose has two large circular openings 33 in the web. The lower end of the double stirrup 10 is constituted by a rod 34 carrying a freely rotatable sleeve 35, to which are rigidly attached the two connecting bars 19 directed in relatively diverging relationship towards the beam 1. The latter is provided with two lugs 36 between which is fixed a rod 37 carrying a freely rotatable sleeve 38 fast with the ends of the bars 19.

The plate 4 also carries two pairs of lugs 39 on which are pivotally mounted at 40 the single stirrup 11; the lower end of the stirrup is constituted by a rod 41 carrying two freely rotatable sleeves 42, to each of which is rigidly attached one of the connecting bars 25, which are directed in relatively diverging relationship towards the beam 1. The latter is provided with two lugs 43 between which is fixed a rod 44 carrying a freely rotatable sleeve 45 fast with the ends of the bars 25. Between the sleeves 42 is rotatably mounted a sleeve 46 to which are rigidly attached the two compensating bars 24.

The construction of the plate 5 of Fig. 3 can easily be deduced from the above description, the stirrups being reversed. It is also easy to deduce the arrangement of plates 4 and 5 of Fig. 1 by importing the necessary modifications to the above description of the arrangement shown in Fig. 5.

Regarding Fig. 5, it will be noted that the four lugs 36, 43 constitute a formation similar to that of the top and bottom horizontal webs of a double T, the vertical web of which is constituted by the web of the beam 1. Such a double T appears also in Figs. 1 and 3.

Thus the stabilizing suspension of an axle as described includes in plan view (Figs. 2 and 4):

(a) On either side of the rigid beam 1, two trapeziums A and B each in the form of an upper surface made up of two diverging connecting bars 14—14 or 17—17 (Figs. 1 and 2), 19—19 or 27—27 (Figs. 3 and 4) pivotally attached on one hand to the beam and on the other hand to the single or double stirrups of the plates 4 or 5, and of a lower surface made up by two diverging connecting bars 14—14 or 17—17 (Figs. 1 and 2), 25—25 or 22—22 (Figs. 3 and 4) pivotally attached on one hand to the beam and on the other hand, to the single or double stirrups of the plates 4 or 5, that is, eight connecting bars in all;

(b) Between the two wheels 2 and 3, a parallelogram linkage C in the form of an upper surface made up of two compensating bars 16—16 (Figs. 1 and 2) or 21—21 (Figs. 3 and 4), pivotally attached on one hand to a single stirrup and on the other hand to a double stirrup and of a lower surface made up of two compensating bars 16—16 (Figs. 1 and 2) or 24—24 (Figs. 3 and 4), which are similarly connected on one hand to a single stirrup and on the other hand to a double stirrup, that is, four compensating bars in all.

Each axle has associated with it three parallel planes X—X', Y—Y' and Z—Z' of which the two former pass through the respective contact points of the wheels 2 and 3 with the ground and contain the circumferential line of the wheel, while the third plane contains the fore-and-aft axis of the beam 1 (Figs. 1 and 3), and these three planes always remain parallel with one another whatever may be the camber or other transverse variation of level of the road or whatever may be the curvature of any turn being executed by the vehicle.

It should be remarked as a matter of fact, and this forms one of the most characteristic and original features of the invention, that with the arrangement described above of an axial chassis and of transverse axle suspensions including connecting and compensating bars as illustrated, the centre of gravity O of the system is in effect transferred to below the axial chassis and below the axis of the vehicle wheels, preferably to substantially the same horizontal level as the lowest point of the inner periphery of the wheel tires.

The suspension spring or springs for each axle may be located at any desired position and may assume any suitable form.

During a right hand turn of the vehicle for instance (Fig. 6) the action and reaction of the contrifugal forces are exerted in the direction of the arrows F, F'; the beam 1 leans over with the plane Z—Z' towards the right hand together with the planes of the wheels X—X' and Y—Y' by reason of the action of the connecting and compensating bars 14, 17 and 16. The three planes X—X', Y—Y' and Z—Z' remain perfectly parallel whatever may be the curvature of the turn and whatever may be the direction of said turn, and the whole vehicle will lean over towards the right hand side.

Figure 7:
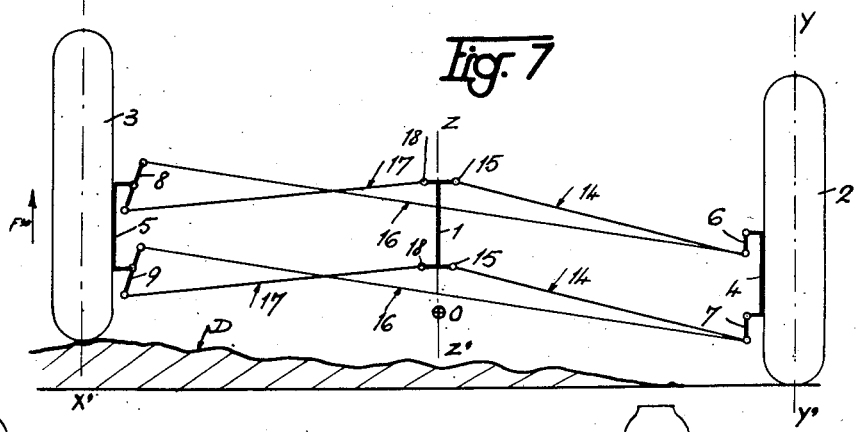

If (Fig. 7) the road is out of level transversely as shown at D, the wheel 3 is higher than the wheel 2, but the three planes X—X', Y—Y' and Z—Z' will nevertheless remain perfectly parallel and equally spaced. The upward thrust F due to the superelevation D, which in the case of an ordinary vehicle would cause the body and chassis together to lean over, is counteracted by the system of connecting and compensating bars of the axle; the wheel 3 rises by reason of the elasticity of the suspension springs, but the vehicle itself is not moved out of its normal upright position, as is apparent from inspection of the figure.

It should be remarked that by reason of the effective location of the centre of gravity O below the axis of the wheels 2 and 3, for instance at the horizontal level of the lowermost point of the internal periphery 47 of the tires 48 (Fig. 8), the propelling force $F_1$ or the braking force $F_2$ will produce a resultant $F_3$ directed towards the ground and will thereby increase the adherence of the wheels to the ground.

Although no stirrup can move without all the other stirrups and the connecting and compensating bars associated with it also taking part in such movement, it is possible where considered desirable, to connect together the two stirrups on one or each side of the vehicle which are located one above the other.

Figure 9:
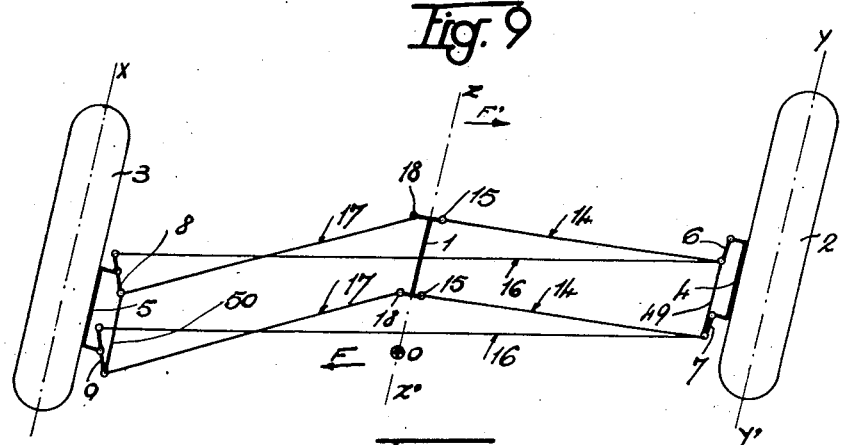
Fig. 9 is a view similar to Fig. 1 to show a modification.
Figure 6:
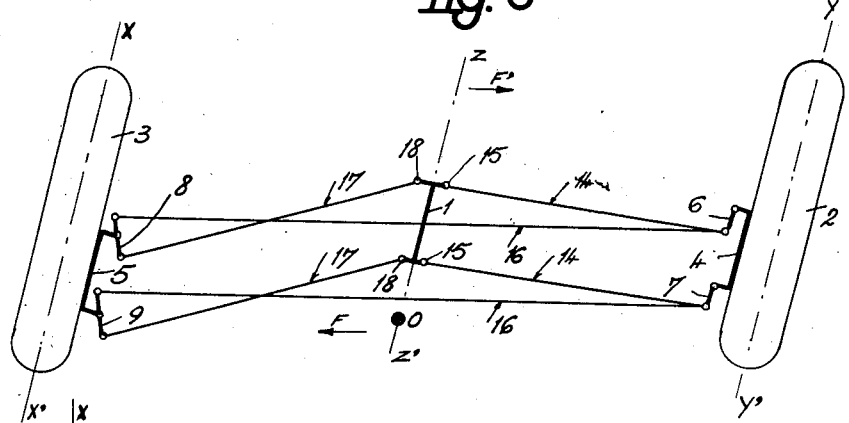
Figs. 6 and 7 are views similar to that of Fig. 1 to show the behaviour of a vehicle negotiating a turn and traversing a road out of level in the transverse direction respectively.

Fig. 9 shows how this connection can be effected and is based on Fig. 6. The right hand stirrups 6 and 7 may be connected by a bar 49 constituting a parallelogram linkage. Similarly, the left hand stirrups 8 and 9 may be connected by a bar 50. It will be evident how similar connecting bars can be added to the other figures.

Figure 10:
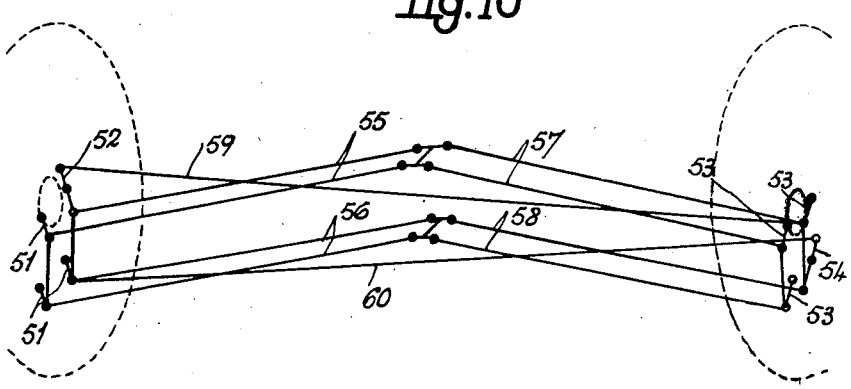
Fig. 10 is a diagrammatical perspective view of a different embodiment of an arrangement.

Fig. 10 illustrates a different embodiment of the suspension device wherein to each of the two plates of the wheel of the axle, two parallel pairs of superimposed stirrups correspond: three simple stirrups 51 and one double stirrup 52 on one side, three simple stirrups 53 and one double stirrup 54 on the other side.

In this latter case, to one simple stirrup 51 or 53 of one plate corresponds the double stirrup 52 or 54 of the other plate. The four stirrups 51 to 54 are always connected through pivoting connecting bars, 55 to 58, to the axial chassis, but two compensating bars 59 and 60 will be then sufficient, connecting the double stirrup (52—54) of one of the plates to the corresponding simple stirrup (51—53) of the other plate.

Figure 11:
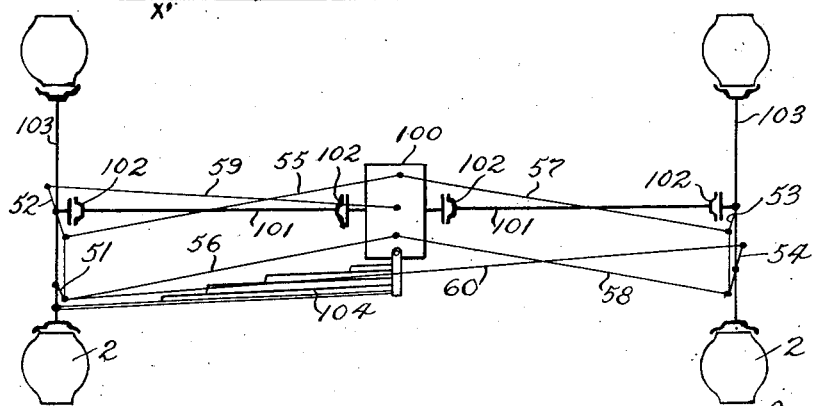
Fig. 11 is a diagrammatic elevational view showing particularly a shaft for each wheel.

Referring to Figure 11, the suspension arrangement of Figure 10 is shown. In this figure 100 represents the rear axle assembly and 101 designates wheel shafts connected by universal joints 102 both to the rear axle assembly and to the fixed wheel discs of the wheels 2. Half of a leaf spring (which would be prolonged on the right side of Figure 1) is shown at 104.

What I claim is:

1. Stabilizing suspension arrangement for vehicles comprising for each axle of the vehicle a rigid chassis member extending axially of the vehicle, on each side of said axial chassis member, two wheel plates, in each of said wheel plates a pivoting wheel, a shaft for each wheel, on each of said wheel plates at least a pair of superimposed pivotally mounted stirrups, pivoting connecting bars connecting each of said superimposed stirrups to said axial chassis member, and pivoting compensating bars connecting at least one of said superimposed stirrups of one of said plates to an extension of the corresponding stirrup of the other plate, said connecting and compensating bars being rigid, said extension being equal and opposite with respect to the pivot of said latter stirrup on its supporting wheel plate.

2. Stabilizing suspension arrangement for vehicles comprising for each axle of the vehicle, a rigid chassis member extending axially of the vehicle, on each side of said axial chassis member, two wheel plates, in each of said plates a pivoting wheel, a shaft for each wheel, on each of said wheel plates at least one pair of superimposed stirrups pivoting on said member, the pivot of the upper stirrup of each of said pairs of superimposed stirrups being provided approximately level with the centre of said corresponding wheel, pivoting connecting bars connecting each of said superimposed stirrups to said axial chassis member, and pivoting compensating bars connecting at least one of said superimposed stirrups of one of said wheel plates to an extension of the corresponding stirrup of the other plate, said extension being equal and opposite with respect to the pivot of said latter stirrup on its supporting wheel plate.

3. Stabilizing suspension arrangement for vehicles comprising, for each axle of the vehicle, a rigid chassis member extending axially of the vehicle, on each side of said axial chassis member, two wheel plates, in each of said plates, a pivoting wheel, a shaft for each wheel, on each of said wheel plates, two parallelly arranged pairs of superimposed pivotally mounted stirrups, pivoting connecting bars connecting each of said superimposed stirrups to said axial chassis member, and pivoting compensating bars connecting one of the stirrups of each of said parallel pairs of superimposed stirrups of one of said plates to an extension of the corresponding stirrup of the other plate, said connecting and compensating bars being rigid, said extension being equal and opposite with respect to the pivot of said latter stirrup on its supporting wheel plate.

4. Stabilizing suspension arrangement for vehicles comprising for each axle of the vehicle, a rigid chassis member extending axially of the vehicle, on each side of said axial chassis member two wheel plates, in each of said plates a pivoting wheel, a shaft for each wheel, on each of said wheel plates two parallel pairs of superimposed stirrups pivoted on said member, pivoting connecting bars connecting each of said stirrups to said axial chassis member and forming on each side of the latter two arms diverging towards it, and pivoting compensating bars connecting at least one of said superimposed stirrups of one of said plates to an extension of the corresponding stirrup of the other plate, equal and opposite with respect to the pivot of said latter stirrup on its supporting wheel plate.

References Cited in the file of this patent

UNITED STATES PATENTS

| 1,535,497 | Roche | Apr. 28, 1925 |
| 1,570,210 | DeConinck | Jan. 19, 1926 |
| 2,162,067 | Dreyer | June 13, 1939 |

FOREIGN PATENTS

| 819,457 | France | Oct. 19, 1937 |